March 5, 1963  K. DIETZ ETAL  3,080,253
PROCESS FOR PROVIDING CONCRETE SURFACES WITH IMPERMEABLE
LAYERS THAT ARE RESISTANT TO THE ACTION
OF CHEMICAL SUBSTANCES AND HEAT
Filed Dec. 24, 1959

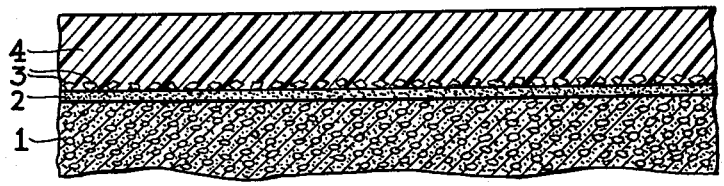

1 = CONCRETE
2 = LAYER IMPARTING ADHESIVENESS
    (TWO OR MORE THIN LAYERS)
3 = SHARP-EDGED INERT FILLING MATERIAL
4 = FINAL LAYER

INVENTORS
KARL DIETZ
GUIDO MAX RUDOLF LORENZ
RUDOLF STROH
BY
Curtis, Morris, & Safford
ATTORNEYS

United States Patent Office 3,080,253
Patented Mar. 5, 1963

3,080,253
PROCESS FOR PROVIDING CONCRETE SURFACES WITH IMPERMEABLE LAYERS THAT ARE RESISTANT TO THE ACTION OF CHEMICAL SUBSTANCES AND HEAT
Karl Dietz, deceased, late of Kronberg, Taunus, Germany, by Elise Dietz, Kronberg, Taunus, Germany, and Georg Dietz, Munich, Germany, heirs; Guido Max Rudolf Lorentz, Frankfurt am Main, and Rudolf Stroh, Hofheim, Taunus, Germany, assignors to Farbwerke Hoechst Aktiengesellschaft vormals Meister Lucius & Brüning, Frankfurt am Main, Germany, a corporation of Germany
Filed Dec. 24, 1959, Ser. No. 861,766
Claims priority, application Germany Dec. 27, 1958
9 Claims. (Cl. 117—26)

The present invention relates to a process for providing concrete surfaces, in particular the inside walls of concrete tubes, with layers that are impermeable and resistant to the action of chemical substances and heat.

Concrete tubes are in general easy to handle and mechanically resistant. They are therefore very useful, for example, in the construction of sewer systems. Concrete tubes have, however, the drawback that, due to their lack of resistance to the action of chemical substanes, they cannot be used in the chemical industry and in allied industries. It is known to apply impermeable layers to the insides of concrete tubes by the so-called centrifugal process, that is to say a process in which a uniform distribution of a layer applied in the liquid state to the interior surface of a concrete tube is ensured by quick rotation of the said tube. For this purpose substances such as bitumen, tar or asphalt are used for they permit application in an easy way. However, the constantly increasing demands of the chemical and allied industries necessitate the invention of a protective layer which can be applied to the interior surfaces of concrete tubes and which is resistant to the action of weakly or strongly acid substances as well as to that of weakly or strongly alkaline substances. Moreover, it is desirable that the protective layer of tubes of the aforesaid kind be insensitive to temperatures of up to about 100° C. and to a quick variation of temperature, viz. to a drop of temperature from approximately 100° C. to about 4° to 5° C. or a rise from about 4° to 5° C. to approximately 100° C.

It might be supposed that known condensation products that are hardenable by the action of heat and/or catalysts could be used as starting material for the preparation of the above-mentioned protective layers that have to be sufficiently resistant to the action of chemical substances and to temperature variations. Masses of this kind, that is to say hardenable resins which may be diluted with appropriate inert fillers and which, if desired, contain hardening catalysts, have to be introduced in such a state of aggregation that they can be evenly distributed on the wall of the concrete tube by the rotating movement of the latter. In order that the aforesaid layers are resistant to the influences of chemical substances and of heat it is necessary that their coefficient of thermal expansion should be as low as possible and that above all the layers to be applied should be intimately connected with the concrete, so that any remaining difference between the thermal expansion of the layer to be applied and that of the concrete can be compensated by adhesive forces. The use of protective layers of the aforesaid kind has hitherto not been possible in practice due to the insufficient adhesion of the layers to the concrete base.

Now we have found that an impermeable layer of synthetic resin that is resistant to the action of chemical substances and of heat can be applied to concrete surfaces by providing the purified concrete surface successively with:

(1) A fundamental layer (layer imparting adhesiveness) of a hardenable synthetic resin, which consists of two or more thin layers whose adhesiveness on concrete is so great that it is at least equal to the tensile strength of the concrete, and which can be hardened by the action of heat and/or a catalyst that does not react with the components of the concrete;

(2) Sharp-edged inert filling materials which are applied to the last of the individual layers of the adhesive agent before the latter is hardened;

(3) A final layer of a hardenable synthetic resin which is impermeable to liquids and resistant to heat and the action of chemical substances.

A coated structure of the type produced by the method just described is shown in the accompanying drawing. The drawing shows concrete substrate 1, over which has been applied two or more thin adhesive layers 2, a layer of particulate inert filling material having sharp edges 3, and final covering layer 4.

As fundamental layer imparting adhesiveness there may be used in the process of the invention, for example, (a) Unsaturated polyester resins, i.e. condensation products of saturated and unsaturated dicarboxylic acids and glycols which are dissolved in appropriate vinyl monomers, for example styrene, which may contain further additives such as inert filling materials, and which can be polymerized, for example with benzoyl peroxide or with appropriate redox systems. As saturated and unsaturated dicarboxylic acids there may be mentioned adipic acid, succinic acid, itaconic acid, phthalic acids, maleic acid and fumaric acid. As glycols there may be mentioned by way of example ethylene glyol, diethylene glycol, 1,2-propylene glycol and 1,3-butylene glycol. As vinyl monomers there are preferably used styrene, phthalic acid diallyl ester, acrylic ester and/or methacrylic ester. By polyester resins there are here to be understood in general products as are described, for example, by J. Bjorksten in "Polyesters and Their Applications," New York (1956), in particular in chapter II, entitled "Resin Manufacture," and chapter VII, entitled "Commercial Resins";

(b) Polyester combinations modified with isocyanate as are described in German Patent No. 1,014,321;

(c) Commercial combinations of polyester and isocyanate, such as of the hydroxy group-containing polyester of polyhydroxy alcohols and polycarboxylic acids sold under the registered trademark "Desmophen" and the polyisocyanate sold under the registered trademark "Desmodur" (cf. the article by O. Bayer in "Angewandte Chemie" 59, pages 257–272, at 264 (1947));

(d) Epoxy resins, that is to say reaction products of epichlorohydrine and appropriate compounds containing hydroxyl groups, for example dihydroxy-diphenyl-dimethylmethane or phenol resins that have been subjected to an acid condensation or polyvalent aliphatic compounds containing hydroxyl groups. Particularly suitable epoxy resins are the products described by R. Wegler in "Chemie der Polyepoxyde," Angewandte Chemie 67 (1955) pages 582 et seq.

As sharp-edged inert filling materials there may be mentioned by way of example crushed inorganic substances, for example material having a grain size of 0.7 to 2.0 millimeters, preferably quartz sand of approximately the aforesaid grain size. These additives are used in a quantity of 1 to 50%.

By self-hardening resins that are suitable for use in forming the final layer according to the invention there are to be understood above all:

(A) Phenol-formaldehyde resins provided with an acid hardener, for example those described in German Patents Nos. 852,906 and 874,836;

(B) Furan resins as obtained by acid condensation, preferably of furfuryl alcohol or another furan component accessible to condensation, and as can be converted to the insoluble, infusible state by the addition of a hardening catalyst giving an acid reaction. Products of this kind have been described above all by A. P. Dunlop in "The Furans," New York (1953), especially pages 774 et seq. ("Furfuryl and Furfuryl Alcohol Resins");

(C) Unsaturated polyester resins modified with isocyanate, for example those described in German Patent No. 1,014,321;

(D) Liquid epoxy resins containing a basic hardener that is active at room temperature, for example those described in German Patent No. 943,195 which are obtained by the reaction of diphenols with an excess of epichlorohydrine.

All of the compounds mentioned under (A), (B), (C) and (D) which are used in the process of the invention are provided with filling materials. Particularly suitable filling materials are powdered quartz, coke dust, powdered graphite, artificial graphite, barium sulfate and titanium dioxide in the form of anatase and rutile. Asbestos fibres having a length of about 1 to 15 millimeters are also very suitable for this purpose. The aforesaid filling materials are added, for example in a quantity of 1 to 60% by weight to the resin either before, during or shortly after the application of the resin to the layers that impart adhesiveness.

The process of the invention can be generally applied for providing solid surfaces, in particular concrete surfaces, and preferably the inner surfaces of concrete tubes, with layers that are impermeable and resistant to the action of heat and chemical substances.

In order to produce the effect according to the invention the first layer that is applied to the concrete surface and which is the first of the layers imparting adhesiveness is applied with the use of a synthetic resin that is strongly diluted with a solvent of low viscosity or with one or more inert solvents, for example one of the synthetic resins mentioned above under (a), (b), (c) or (d). The synthetic resin or the solution of the synthetic resin penetrates to a large extent and deeply into the pores of the concrete. As inert organic solvents that are suitable for dissolving the synthetic resins there may be mentioned above all acetone, benzene, toluene and xylene. There may also be used with a good result methyl-ethyl-ketone, diethyl-ketone, cyclohexane, dioxane, tetrahydrofurane, aliphatic hydrocarbons or mixtures thereof containing about 3 to 10 carbon atoms, diethyl ether, dibutyl ether and diisopropyl ether. The solvents are usually applied in such a quantity that a solution forms which has a viscosity within the range of about 5 to 50 centipoises, preferably 8 to 15 centipoises. For this purpose it is in most cases necessary to add 20 to 60% by weight of solvent to the resin. After the first layer has been applied the resin is thermally or catalytically hardened. If the resin is to be hardened with the use of a catalyst there may only be used catalysts which do not react with the concrete, for example benzoyl peroxide, diethylene triamine, ethyl diamine or usual redox systems. The first layer forms a thin deeply anchored film on the concrete. To this first hard film there is then applied a hardenable resin that can be brushed or sprayed, for example one of the resins mentioned above under (a), (b), (c) or (d), or the solution of such a resin. Since the first layer is deeply anchored in, and consequently adheres well to, the porous concrete which is thereby sealed the viscosity of the resin that forms the second adhesive layer can be higher than that of the first resin or its solution. If desired, further layers may be applied to the second adhesive layer. The resins forming the first or the second or the following adhesive layers may be of the same or of different nature. The last layer of the layers imparting adhesiveness is sprayed while still moist and sticky with sharp-edged inert filling materials, for example quartz sand, having a grain size of about 0.7 to 2.0 millimeters and it is then hardened either immediately, which is the preferred mode of operating, or simultaneously with the final layer. The resin component of the last adhesive layer has to be such that the resins which are to be applied subsequently and which constitute the protective layer proper and are admixed with inert filling materials, for example powdered quartz, coke or synthetic graphite, adhere well to the thin film. The entire adhesive layer has to be so thin that its influence on the totality of the layers can be neglected with respect to thermal expansion. This requirement is complied with when the entire fundamental adhesive layer has a thickness which, depending on the thickness of the final layer, is within the range of 0.05 to 1.0 millimeter. It is advantageous to apply the adhesive fundamental layer in a thickness of altogether 0.05 to 0.5 millimeter. The ratio of the thickness of the adhesive fundamental layer to the thickness of the final layer is suitably about 1:100 or preferably 1:20.

The last layer imparting adhesivness which is provided with sharp-edged material is covered while still sticky with a final layer consisting of self-hardening resins as are, for example, mentioned above under (A), (B), (C) and (D), the final layer being applied in a thickness of about 1 to 7 mm., preferably 5 to 6 mm., and it is then hardened. A suitable way of applying the final layer, for example, to concrete tubes consists in distributing the mixture of syntheic resin, filling material and hardener uniformly on the surface of the concrete tube by the rotating movement of the latter. The consistency of the resin mixture is advantageously adjusted so that its flowability enables the above-mentioned uniform distribution to be realized. It is particularly advantageous for this purpose that about 10 to 50% of the inert filling material added to the hardenable resin should have a globular or approximately globular form, for example, river sand that is free from lime. The rotating movement of the concrete tube is continued until the layer of resin that has been introduced is uniformly and smoothly distributed on the internal surface and the resin layer is hardened to such an extent that after the end of the rotating movement it adheres perfectly to the tube.

Hardening mixtures of phenol resin and filling material which owing to their composition have a certain swelling capacity are particularly suitable for use in lining the inside walls of concrete tubes. By the swelling taking place in the course of the hardening process the layer of synthetic resin is pressed still more firmly to the concrete tube.

The process of the invention enables coatings to be prepared which are distinguished by their great mechanical and chemical resistivity. The layers according to the invention adhere particularly firmly and reliably to the surfaces to which they are applied. They are absolutely resistant to the action of heat up to elevated temperatures, for example up to about 120° C., and to quick variations of temperature, which variations may occur within wide ranges of temperature, for example within a range of about 110° C. to 2° C. It is particularly important with regard to the industrial application of the present process that it enables coatings to be prepared which have not only an extraordinarily good resistivity to the action of chemicals such as acids, alkalis, solvents or organic bases but which in addition thereto are resistant to the action of oxidizing chemicals of alkaline and of acid nature.

In the following paragraph will be given some examples illustrating the adhesiveness of the layers prepared by the process of the invention.

Some of the adhesive films which have been mentioned above by way of example present the following values of adhesiveness after having been hardened.

| Product | Adhesiveness on concrete, kg./cm.² | Adhesiveness of the resin layer on the film, kg./cm.² |
|---|---|---|
| (I) Reaction product of phthalic acid anhydride and maleic acid anhydride with ethylene glycol in 30% of styrene, prepared by the process described in German Patent No. 1,014,321 | 24 | 50 to 60 |
| (II) Commercial liquid epoxy resin obtained from a reaction product of dihydroxy propane and epichlorohydrin and which has been hardened with ethylene diamine | 26 | 50 to 60 |

The values were ascertained as follows:

Shaped stones of concrete having a closely defined plane surface of adhesion were prepared. The adhesive film was applied to said stones. A viscous resin obtained by the process described in German Patent No. 1,014,321 was diluted with acetone in a ratio of 1:1 and the catalyst which in this case was benzoyl peroxide was introduced. The solution which had thus been diluted was applied to the concrete and left for some time until hardening set in. The first coat was absorbed almost completely by the concrete. Subsequently a second coat was applied. In this case the quantity of diluent that was added was only 10% of the quantity of the resin. A hard bright film was obtained. Then another layer was applied which was analogous to the second layer but which had been strewn while still moist with sharp-edged quartz sand having a grain size of about 0.7 to 2 millimeters. The last layer was allowed to dry and harden. Then a phenol resin which is hardenable with an acid catalyst was admixed with an inert filling mixture of coke and synthetic graphite and applied in a thickness of about 5 millimeters to the resin layer provided with an inert filler. To the other surface of the resin layer there was then fixed by adhesion a body of steel which was provided with an adhesive layer of epoxide, the surface of the body of steel that was applied to the resin layer having the same dimensions as the surface of the concrete stone to which the resin layer was applied. Since the adhesion of epoxide resin to steel amounts to 100 kg./cm.² and the adhesion of synthetic resins amounts to 50 to 60 kg./cm.² the adhesion on concrete which was the weaker member could be ascertained in this way without difficulty. In every case it was noticeable that in the case of the values indicated above the concrete was torn and part of it adhered to the adhesive film.

The following examples serve to illustrate the invention but they are not intended to limit it thereto:

Example 1

A concrete tube which was freed mechanically from the loose layer of lime adhering to its inner wall was clamped into a device as is used, for example, for the preparation of tubes of concrete moulded by centrifugal action and the first adhesive layer was applied. In order to enable the resin to penetrate as deep as possible into the concrete the resin which was a polyester resin provided with hardening agents was strongly diluted with acetone, an appropriate inert solvent which does not attack the concrete and which does not influence the hardening process of the resin film to be applied. After the first coating had hardened a second layer consisting of the same resin as the first was applied. The resin constituting the second film was only diluted to such an extent that it could be brushed or sprayed, the quantity of solvent amounting to 10% by weight, calculated on the resin. After the hardening a hard bright film remained behind. Then another coating was applied which in its structure corresponded to the second coating. The said upper coating was strewn while still fresh with sharp-edged quartz sand having a grain size of 0.7 to 1.2 millimeters. Then a mixture of resin, filler and hardener which had been prepared by the process described in German Patent No. 852,960 was introduced into the tube. As filler there was used 30% of river sand free from lime. The consistency of the mixture of resin and filler was adjusted so that the mixture could be uniformly distributed on the surface of the concrete tube by the rotating movement of the latter. The rotating movement of the concrete tube was continued until:

(a) The resin layer that had been introduced was distributed uniformly and smoothly on the inner surface and (b) The resin had hardened to such an extent that after the end of the rotating movement its adhesion to the tube was unobjectionable.

Example 2

A concrete tube which had been freed mechanically, for example by brushing, from the loose layer of lime adhering to its inner wall was clamped into a device as is also used for the preparation of concrete tubes moulded by centrifugal action and as is generally known in the industry. The first adhesive layer which consisted of a solution of 70 parts by weight of polyepoxy resin and 30 parts by weight of xylene (viscosity of the solution 20 centipoises; dry residue of the epoxide resin after it had been dried for 2 hours at 170° C.: 99.9% of epoxide, equivalent of epoxide 195) and an amine, viz. diethylenetriamine, serving as hardener (100 parts of resin to 20 parts of hardener) was then applied to the tube. After the first coating had hardened a second coating of the above-mentioned epoxide resin was applied, the resin being this time dissolved in xylene so as to yield a solution of only 20% strength. The second coating was strewn while still moist with coarse quartz sand having a grain size of 0.7 to 1.2 millimeters.

As final layer there was then applied a mass obtained by a centrifugal process and consisting of 100 parts by weight of the epoxide resin described above (dissolved in xylene so as to yield a solution of 20% strength), 20 parts by weight of hardener (diethyl-triamine) and 600 parts by weight of a powder consisting of 1 part by weight of asbestos fibres, the fibres having a length of 11 millimeters, 40 parts by weight of a quartz sand having a grain size of 0.7 to 1.2 millimeters (round grains) and 59 parts by weight of a quartz sand having the following grain size distribution:

| Number of meshes per square centimeter | Width of meshes (millimeters) | powdered quartz, percent |
|---|---|---|
| 100 to 400 | 0.6 to 0.3 | 2.40 |
| 400 to 1600 | 0.3 to 0.15 | 32.00 |
| 1600 to 3600 | 0.15 to 0.10 | 35.00 |
| 3600 to 6400 | 0.10 to 0.075 | 10.00 |
| 6400 to 10,000 | 0.075 to 0.060 | 6.20 |
| more than 10,000 | <0.060 | 14.40 |

The mass was introduced into the tube and uniformly distributed on its wall by the quick rotating movement of the tube (speed of the tube which had a diameter of 60 centimeters, 200 revolutions per minute). The speed of the rotation was then reduced to 50 to 70 revolutions per minute in order to avoid that the mixture was separated into its component parts to too high a degree. During the rotating movement the tube was heated to a temperature within the range of 40 to 50° C. so that the period necessary for the masses applied to the wall of the tube by the centrifugal action to harden was short enough to be suitable for industrial purposes.

*Example 3*

A concrete tube which had been freed mechanically, for example by brushing, from the loose layer of lime adhering to its inner wall was clamped into an appropriate device as is also used for the preparation of tubes of concrete moulded by centrifugal action and as is generally known in the industry. The first coating that was applied was a polyester resin consisting of a commercial unsaturated polyester that was hardenable with benzoyl peroxide. For the first coating the aforesaid polyester resin was diluted with acetone to such a degree that the coating had a viscosity of about 10 centipoises. For the second layer the same polyester resin was used which in this case was, however, diluted to such a degree that the viscosity was about 200 centipoises. The second coating was strewn while still moist with sharp-edged quartz sand having a grain size of 0.7 to 1.2 millimeters. After the second coating had hardened a mixture consisting of a furfuryl alcohol resin (obtained by acid condensation of furfuryl alcohol), paratoluene sulphonic acid serving as hardener and a coke mixture consisting of equal portions of coarse and finely powdered coke was applied by centrifugal action, the coke having the following grain size distribution:

| Number of meshes per square centimeter | Width of meshes in millimeters | Coke (fine), percent | Coke (coarse), percent |
| --- | --- | --- | --- |
| 100 | 0.60 | | 2.22 |
| 400 | 0.30 | 0.20 | 48.96 |
| 1,600 | 0.15 | 2.76 | 32.55 |
| 3,600 | 0.10 | 8.26 | 7.36 |
| 4,900 | 0.09 | 6.19 | 2.82 |
| 10,000 | 0.06 | 16.49 | 3.79 |
| more than 10,000 | less than 0.06 | 66.10 | 2.30 |

The mixture contained 6% of hardener. The ratio of the mixture of furfuryl alcohol resin and filler was 1:3.3.

The mixture of resin and filler was introduced into the concrete tube in which it was uniformly distributed by the high speed of revolution. The speed of revolution was then reduced as in the preceding example in order to avoid a separation of the hardening mixture into its components. The concrete tube was heated to 40° C. so that the hardening of the material that had been introduced could be brought about in an economically reasonable time.

The layer that had been applied by centrifugal action had a thickness of 5 millimeters.

*Example 4*

A concrete tube which was freed mechanically from the loose layer of lime adhering to its inner wall was clamped into an appropriate device as is used for the preparation of tubes of concrete obtained by the centrifugal process. As the first coating a polyester resin was applied which was a commercial unsaturated polyester resin that could be hardened with benzoyl peroxide. The polyester resin was diluted with acetone to such a degree that the viscosity of the coating was about 10 centipoises. For the second layer the same polyester resin was used but in this case the resin was diluted to such a degree that the viscosity was about 200 centipoises. The second layer was strewn while still moist with sharp-edged quartz sand having a grain size of 0.7 to 1.2 millimeters. After the second coating had hardened a mixture consisting of equal portions of powdered quartz as described in Example 1 and powdered quartz No. 8 and a polyester mixture was applied by centrifugal action. The powdered quartz No. 8 had the following grain size distribution:

| Number of meshes per square centimeter | Width of meshes in millimeters | Quartz powder No. 8, percent |
| --- | --- | --- |
| 100 to 400 | 0.6 to 0.3 | 0.02 |
| 400 to 1,600 | 0.3 to 0.15 | 0.06 |
| 1,600 to 3,600 | 0.15 to 0.10 | 0.30 |
| 3,600 to 6,400 | 0.10 to 0.075 | 2.88 |
| 6,400 to 10,000 | 0.075 to 0.060 | 5.40 |
| more than 10,000 | <0.060 | 91.34 |

The aforesaid polyester mixture was composed of 15 parts of a solution of an unsaturated polyester which was dissolved in styrene, the solution having a strength of 70%, and which contained free hydroxyl groups as terminal groups, and 15 parts of an unsaturated polyester which was dissolved in styrene and whose free hydroxyl groups were modified with an excess of di-isocyanates so that the resin component contained free isocyanate groups that were not bound. 1% of a hardening paste consisting of 50 parts of benzoyl peroxide and 50 parts of di-butyl phthalate were added to the totality of the above-mentioned solutions. The resin mixture that had thus been prepared was introduced into the concrete tube and distributed by the rotating movement as has been described in the preceding examples. In this experiment it was not necessary to heat the tube since the polyester which has been described hardened at room temperature, that is to say at a temperature within the range of 15° to 25° C., within a period that is economically reasonable.

We claim:

1. A process for providing a porous solid surface with an impermeable coating resistant to chemicals and to heat, which process comprises applying to said porous surface a penetrating fluid having a viscosity of about 5 centipoises to 50 centipoises and consisting essentially of a material selected from the group consisting of an unsaturated polyester resin, an isocyanate modified polyester resin, and a reaction product of a polyisocyanate and an epoxy resin, which material is then hardened to form an adhesive layer (I); applying thereover at least one additional layer (II) of a material as in layer (I) with hardening of each layer, except the last, after application, the combined thickness of layers (I) and (II) being between about 0.5 to 1 millimeter; applying to the last of said layers (II), before it has hardened and while it is still moist and sticky, particles of a first inert filling material having sharp edges, said particles having a size between about 0.7 to 2 millimeters, to form a particle-containing layer (III); and then applying thereover a final layer (IV) between about 1 to 7 millimeters thick, consisting of a resin selected from the group consisting of a phenol formaldehyde resin, a furan resin, and an epoxy resin and between about 1 to 60 percent, based on the weight of resin, of a second inert filler, which layer is then hardened.

2. A process as in claim 1 wherein said particle containing layer (III) is hardened before said final layer (IV) is applied.

3. A process as in claim 1, wherein said particle containing layer (III) is hardened simultaneously with said applied final layer (IV).

4. A process as in claim 1 wherein said porous surface is a concrete surface.

5. A process as in claim 1 wherein the material comprising adhesive layer (I) is applied as a low viscosity resin.

6. A process as in claim 1 wherein the material comprising adhesive layer (I) is applied dissolved in an inert solvent.

7. Conduit means resistant to chemicals and heat comprising a tube of porous concrete having internal and external surfaces; on the internal surface of said tube a penetrant adhesive layer (I) consisting essentially of a hardened resin selected from the group consisting of an unsaturated polyester resin, an isocyanate-modified polyester resin, and a reaction product of a polyisocyanate and an epoxy resin; at least one additional hardened layer (II) of a material as in layer (I) applied over said layer (I), the combined thickness of said layers (I) and (II) being between about 0.5 to 1 millimeter; applied over said layer '(II), a layer (III) of particles of a first inert filling material having sharp edges, said particles having a size between about 0.7 to 2 millimeters; and, over said layer (III), a final layer (IV) between about 1 to 7 millimeters thick, consisting of a hardened resin selected from the group consisting of a phenol formaldehyde resin, a furan resin, and an epoxy resin and between about 1 to 60 percent, based on the weight of resin, of a second inert filler.

8. Conduit means as in claim 7, wherein said first inert filler having sharp edges is quartz sand.

9. Conduit means as in claim 7, wherein said second inert filler is a material selected from the group consisting of powdered quartz, powdered coke, powdered graphite, synthetic graphite, barium sulfate, and titanium dioxide.

References Cited in the file of this patent

UNITED STATES PATENTS

| | | |
|---|---|---|
| 2,109,644 | Klingensmith | Mar. 1, 1938 |
| 2,120,309 | Carson | June 14, 1938 |
| 2,248,098 | Cornelius et al. | July 8, 1941 |
| 2,330,365 | Jackson | Sept. 28, 1943 |
| 2,752,275 | Raskin et al. | June 26, 1956 |
| 2,861,011 | Asbeck et al. | Nov. 18, 1958 |
| 2,930,710 | Koenecke et al. | Mar. 29, 1960 |